UNITED STATES PATENT OFFICE.

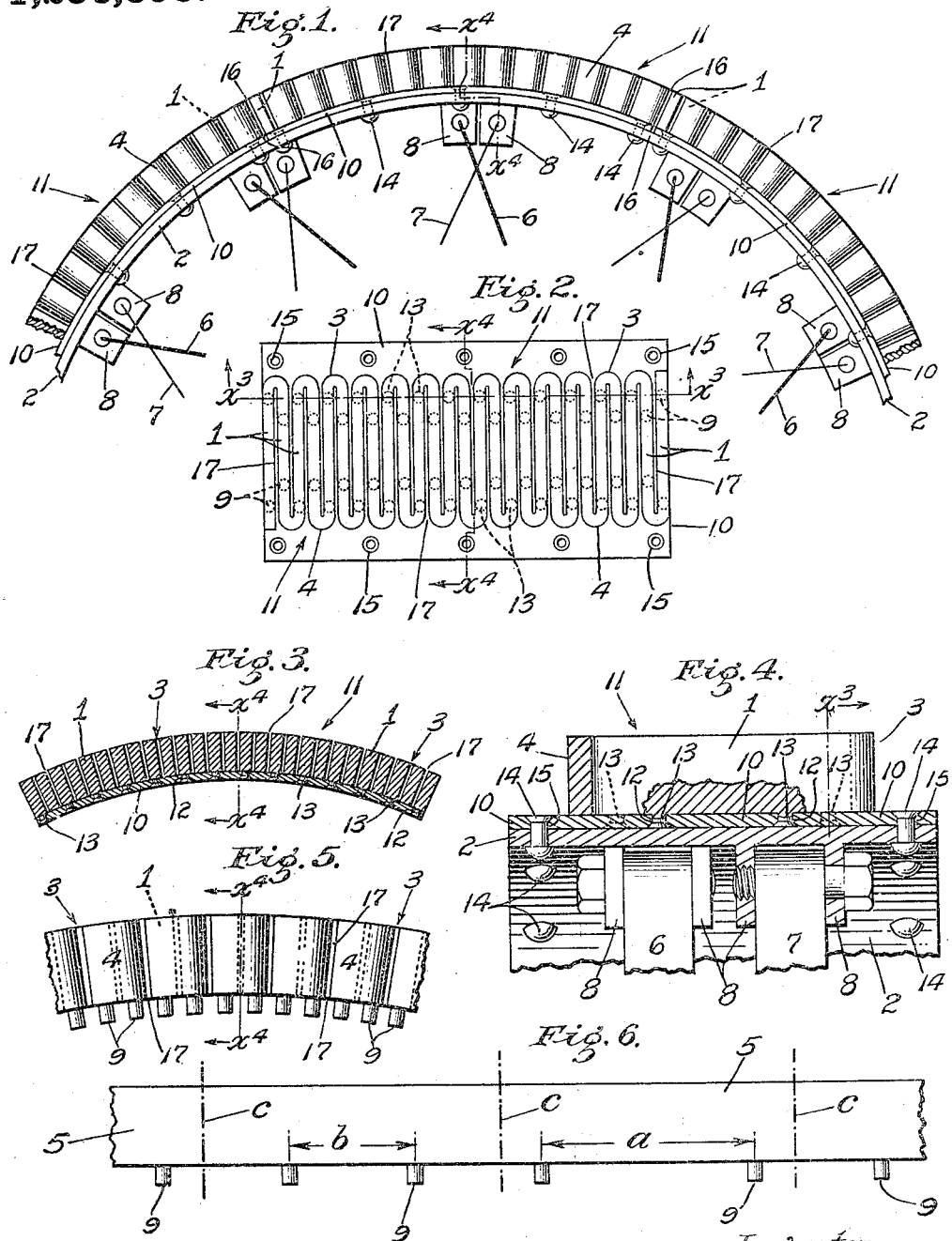

MICHAEL F. SCHOENBERGER, OF LOS ANGELES, CALIFORNIA.

WHEEL.

1,256,598.  Specification of Letters Patent.  Patented Feb. 19, 1918.

Application filed January 25, 1916. Serial No. 74,268.

*To all whom it may concern:*

Be it known that I, MICHAEL F. SCHOENBERGER, a citizen of the United States, residing at Los Angeles, in the county of Los Angeles and State of California, have invented new and useful Improvements in Wheels, of which the following is a specification.

The object of this invention is to provide certain improvements in wheels comprising tires adapted to coöperate with a resilient wheel rim of the form set forth in my patent application Serial No. 74,267, filed Jan. 25, 1916, to afford radial inward movement of the rim under stress.

The invention is essentially adapted to automobiles and heavy auto-trucks and comprises a construction applicable as a continuous tire extending completely around the wheel or as a plurality of separate segments, and in the following claims I use the word "tire" as including both segmental and continuous tires, although in the preferred embodiment of my invention I make the tire in separate segments.

Another object is to provide a tire applicable to rigid as well as resilient wheels and which will be non-skidding and afford positive contact with the ground.

The tire comprises a metallic band that is disposed upon the rim of the wheel in parallel axial folds which folds form an outer periphery to serve as a grip tread and also permit of change of curvature of the tire as the resilient rim flattens out under a load, said folds being radial to the axle and transverse to the tread.

Other objects are simplicity and cheapness of construction, as well as long life and superior efficiency of operation.

These and other features, capabilities and advantages will become apparent from the subjoined detail description of one specific embodiment of the invention.

The accompanying drawings illustrate the invention.

Figure 1 is a fragmental elevation of a tire constructed in accordance with this invention and applied to a wheel, a portion of which is shown.

Fig. 2 is a developed plan view of one of the tire segments detached.

Fig. 3 is a circumferential section through one of the tire segments on line $x^3$, Figs. 2 and 4.

Fig. 4 is an enlarged transverse section on irregular line $x^4$, Figs. 1 and 2, also on line $x^4$ Figs. 3 and 5, showing a tire-segment in place upon the wheel rim.

Fig. 5 is an enlarged fragmental elevation illustrating the novel tire formation.

Fig. 6 is a developed view of the metallic band before bending into tire form.

By the present invention I provide a metallic tire of a corrugated nature composed of parallel axial members 1 arranged upon the wheel rim 2 and united together by side connections which, in the present instance, comprise bends 3, 4, alternately arranged first upon one side and then upon the other.

Said tire is preferably formed by bending a flat metal band 5 back and forth in a series of axial folds or layers that lie in a circumferential surface corresponding to the periphery of the wheel, said band folds being slightly spaced apart with the inner periphery thereof disposed around the rim 2 and the outer periphery serving as a tread for the wheel.

This tire may be used in connection with a rigid wheel rim to afford a non-skidding and gripping contact with the ground, but is of particular advantage when used in combination with an elastic wheel rim to coöperate therewith, which latter form of rim is shown in the accompanying drawing. Said elastic rim 2 is supported in any desirable manner as by resilient hub blades 6, 7, connected thereto between the annularly-arranged lugs 8, said blades being shown diagrammatically in Fig. 1.

The flat metal band 5 (see Fig. 6) is provided with studs 9 appropriately spaced along one edge thereof, which studs serve as anchoring means to secure the band in place after the same is bent into proper formation. Said studs are preferably spaced in alternating pairs, the span $a$ of one pair being greater than the span $b$ of the other pair and the arrangement being such that when the band is bent at the indicated lines $c$, the studs will be positioned in side rows (see Fig. 2) with the studs of each row in staggered relation, one with the other.

It is to be noted that the axial folds are also radial, width-wise thereof, to the axis of the wheel, thus giving strength and long wearing qualities to the tire.

This folded tire formation may be applied to the wheel either as a continuous tire or as a plurality of separate segments, which latter form is shown in the particular case illustrated.

Each of the segments comprises a plate section 10 of an elastic nature conforming to the periphery of the rim together with a section 11 of the folded band secured thereto by means of the staggered studs 9 that are inserted through corresponding holes 12 in the plate section and then upset to form rivets 13. By the staggered arrangement of the studs 9 and holes 12 a firm anchorage of the band section 11 is secured without unduly weakening the plate section.

As will be seen in the drawing each plate section 10 is substantially the same length as its corresponding band section 11, while the side portions of said plate section 10 overhang or extend beyond the side band folds 3, 4, the sections 10 being secured in turn to the rim 2 as by rivets 14 extending through holes 15 in said overhanging portions, and thence through the rim.

The segments are each made of a circumferential length corresponding to some divisor of the circumference of the wheel, in order that they may be accurately fitted to the wheel and when applied to an elastic rim, said segments are mounted with intervening spaces 16 therebetween which spaces afford clearance for the purpose of allowing the lengthening of the segments as they straighten out to permit of change of curvature of the tire under a load.

It is thus seen that I have provided a strong and durable metal tire having a non-skidding tread as well as a tire of an elastic nature to afford an efficient cushioning action when used in connection with a resilient wheel rim. The intermediate spaces 17 between the axially and radially arranged members 1 and the spaces 16 between the segments allow the tire to flatten out or curve up in response to contraction or expansion of the wheel rim under load.

Although I at present contemplate using metal to construct the tire it is obvious that certain advantages may be attained by employing a folded band of the form and in the manner set forth constructed of any suitable material; and I do not intend to limit the invention to metal alone, but expect to employ any known equivalents therefor as occasion may prove desirable.

It is also understood that I do not limit the use of the invention to automobiles and trucks but that it may be employed wherever found desirable in actual practice without departing from the spirit of this invention.

The plates 10 may be variously constructed to attain the desired degree of resiliency and it is understood that the invention is not limited to specific constructions.

I claim:—

1. A metal tire to fit the resilient rim of a wheel, said tire comprising circumferential folds axially arranged, the inner periphery of said folds being disposed around said rim and the outer periphery serving as a tread for said wheel, and integral studs depending from the edges of said inner periphery to secure the folds in place upon the rim.

2. A tire segment comprising a plate adapted to be applied to the rim of a wheel; a metallic band disposed on said plate in a series of radial transverse folds, the outer periphery of said folds forming a tread surface for the wheel; means to anchor said band to the plate; and means to mount the plate upon the rim of the wheel.

3. A tire segment comprising a plate adapted to be applied to the resilient rim of a wheel; a metal band disposed on said plate in a series of axial folds, the outer periphery of said folds forming a tread surface for the wheel; studs depending from the inner periphery of said folds to anchor said band to the plate; said folds being slightly spaced apart to thus permit of change of curvature of said tread surface; and means to mount the plate upon the rim of the wheel.

4. A tire segment comprising a plate adapted to be applied to the rim of a wheel; a metallic band bent back and forth on said plate in a series of axial folds, the outer periphery of said folds forming a tread surface for the wheel; studs depending from the inner periphery of said folds to anchor said band to the plate; and means to mount the plate upon the rim of the wheel.

5. A tire segment comprising a plate adapted to be applied to the rim of a wheel; a metal band bent back and forth on said plate in a series of axial folds, the outer periphery of said folds forming a tread surface for the wheel; studs depending from the inner periphery of said folds to anchor said band to the plate; said studs being spaced along the inner edge of said metal band so as to form side rows when the band is bent into formation, the studs of each row being in staggered relation one with the other; and means to mount the plate upon the rim of the wheel.

In testimony whereof, I have hereunto set my hand at Los Angeles, California, this 17th day of January, 1916.

MICHAEL F. SCHOENBERGER.

Witness:
JAMES R. TOWNSEND.